United States Patent [19]

Chou

[11] Patent Number: 4,481,105

[45] Date of Patent: Nov. 6, 1984

[54] PROCESSING OF HYDROCARBONS IN FIXED CATALYST BED WITH REDISTRIBUTION MEANS

[75] Inventor: Tai-Sheng Chou, Sewell, N.J.

[73] Assignee: Mobil Oil Corporation, New York, N.Y.

[21] Appl. No.: 411,142

[22] Filed: Aug. 25, 1982

[51] Int. Cl.³ .............................................. C10G 11/10
[52] U.S. Cl. .................................. 208/146; 208/157; 208/216 R; 422/220
[58] Field of Search ................... 208/120, 146, 216 R, 208/254 H, 213, 157; 422/220

[56] References Cited

U.S. PATENT DOCUMENTS

| | | | |
|---|---|---|---|
| 2,916,361 | 12/1959 | Lewis et al. | 422/220 |
| 3,112,256 | 11/1963 | Young et al. | 208/213 |
| 3,146,189 | 8/1964 | Kunreuther et al. | 208/146 |
| 3,218,249 | 11/1965 | Ballard et al. | 208/108 |
| 3,502,445 | 3/1970 | Ballard et al. | 422/220 X |
| 3,524,731 | 8/1970 | Effron et al. | 23/288 |
| 3,685,971 | 8/1972 | Carson | 23/288 |
| 3,732,078 | 5/1973 | Kassarjian | 23/288 |
| 3,888,633 | 6/1975 | Grosboll et al. | 208/146 X |
| 3,960,508 | 6/1976 | Bessant et al. | 208/146 X |
| 4,002,682 | 5/1977 | Bludis et al. | 208/254 H |
| 4,005,985 | 2/1977 | Hutson, Jr. | 208/146 X |
| 4,116,819 | 10/1978 | Frayer et al. | 208/216 R X |
| 4,138,327 | 2/1979 | Scott | 208/146 |
| 4,267,033 | 5/1981 | Heck et al. | 208/254 H X |
| 4,285,910 | 8/1981 | Kennedy, Jr. | 422/220 X |
| 4,380,529 | 4/1983 | Gupta | 422/220 |

FOREIGN PATENT DOCUMENTS 614501 2/1961 Canada ............................. 422/220

OTHER PUBLICATIONS

Trasi et al., *Residence-Time-Distribution Studies on a Gas-Liquid Countercurrent Packed Column with Intermittent Voids along the Axis*, Industrial and Engineering Chemistry Fundamentals, vol. 18, No. 3, pp. 256-260 (1979).

*Primary Examiner*—Delbert E. Gantz
*Assistant Examiner*—Glenn A. Caldarola
*Attorney, Agent, or Firm*—A. J. McKillop; M. G. Gilman; L. P. Hobbes

[57] ABSTRACT

Hydrocarbons are processed in a co-current flow packed catalyst bed reactor containing one or more redistribution means, e.g., redistribution screens, in the packed catalyst bed. If more than one redistribution means are used, they are spaced within the bed of catalyst over a predetermined distance. Optionally, the surface area of the redistribution means is less than the cross-sectional surface area of the reactor bed to allow for packing of a relatively smaller size solid particles, as compared to the rest of the catalyst in the bed, in the area between the edge of the redistribution means and the inner wall of the reactor means. The use of the redistribution means prevents channeling of the reactants near the reactor wall region, and assures uniform distribution of the reactants throughout the packed catalyst bed. The invention is applicable to relatively low velocity systems operating at liquid linear velocity of 0.3 cm/sec. or less.

11 Claims, 7 Drawing Figures

PROCESSING OF HYDROCARBONS IN FIXED CATALYST BED WITH REDISTRIBUTION MEANS

BACKGROUND OF THE INVENTION

1. Field of the Invention

This invention relates to an improved method for effecting catalytic reactions in fixed catalyst beds with mixed-phase co-current flow. More particularly, this invention is directed to a method of improving flow distribution of reactants through a fixed bed of catalytic material.

2. Description of Prior Art

Many chemical, petroleum processing and petrochemical reactions require effective contact of the feed with a catalyst used in the process. One of the means for effecting such a contact comprises the use of a fixed catalyst bed reactor wherein the feed is passed through the catalyst bed. If more than one phase for the reactant is needed to carry out the reaction, the reactants may be passed either co-currently or counter-currently through the catalyst bed. Whether the reaction is conducted co-currently or counter-currently, it is important to assure that the feed is distributed substantially uniformly throughout the fixed bed of catalyst. Otherwise, the likelihood of channeling of the reactants through the catalyst bed is increased, which results in reduced conversion, non-uniform product composition, increased recycle rates, short cycle length and loss of control over the course of the reaction.

Thus, attempts have been made in prior art to improve distribution of the reactants throughout the catalyst bed. For example, Scott, U.S. Pat. No. 4,138,327, discloses a vapor liquid distributor for catalytic reaction beds, comprising three annular form, catalyst-free volumes placed within the catalyst bed and defined by the interior surface of the catalyst chamber and three cylindrical walls in concentric relationship therewith. U.S. Pat. No. 3,146,189 discloses a device for the initial distribution of a vapor/liquid feedstream to a fixed bed of catalyst particles. The liquid and vapor components of the feed are introduced separately into the catalyst bed through a horizontal plate containing liquid and vapor downcomers. The vapor downcomers extend into the bed of catalyst particles, and they are designed to afford lateral vapor flow through the bed of catalyst.

Effron et al., U.S. Pat. No. 3,524,731 discloses a distributor apparatus in a reactor designed to minimize channeling effects of the mixed-phase components used therein. The distributor comprises a horizontal plate having inserted through it a plurality of short tubes and longer tubes which are notched near the point of contact of the tubes with the horizontal plate.

U.S. Pat. No. 3,685,971 discloses a distributor similar to that of U.S. Pat. No. 3,146,189. The distributor of the U.S. Pat. No. 3,685,971 is located adjacent to the reactant inlet port, and its discharge end comprises a plurality of depending, spaced-apart concentric baffle members which produce an outward deflection of concentric, annular-form flow streams to an area of the lower catalyst bed.

Ballard et al., U.S. Pat. No. 3,218,249, disclose a bubble cap feed arrangement which improves the distribution of mixed vapor-liquid reactant phases over a fixed bed of catalyst.

Kassarjian, U.S. Pat. No. 3,732,078, provides a different means for minimizing channeling in a fixed catalyst reactor bed. The redistributor of Kassarjian comprises a deflector, e.g., a six inch wide rim around the inside perimeter of the reactor, in conjunction with a load of low flow resistance particles, e.g., balls, loaded immediately below the rim.

Trasi and Khang demonstrated that for gas-liquid counter-current flow in a packed bed with intermittent voids along the axis significant improvement in the distribution of the reactants was observed (Industrial and Engineering Chemistry Fundamentals, Vol. 18, No. 3, pages 256–260, 1979).

However, none of the aforementioned publications has successfully solved the problem of non-uniform distribution of co-current flow of liquid and liquids/vapor reactants through a packed bed of catalyst. Moreover, the problem of non-uniform distribution of the reactants through a packed catalyst bed in relatively low liquid velocity systems (liquid hourly space velocity of 2 or less), e.g., in the processing of heavy natural and synthetic crudes, has not been heretofore adequately addressed. At such low liquid flow rates there is a tendency for the liquid reactant to reach its liquid equilibrium distribution between the wall of the reactor and the liquid trickling over the catalyst surface because, it is thought, greater void volume of the catalyst is found in that region. Consequently, a uniform liquid distribution attained near the top of the packed catalyst bed does not guarantee a uniform liquid distribution a few feet down the bed. The non-uniform distribution occurs primarily because of the increased rate of liquid flow near the wall region of the reactor, wherein the void volume of the catalyst is usually greater than in the center of the usually circular cross-section of the catalyst bed.

SUMMARY OF THE INVENTION

In accordance with the present invention, at least one, and preferably two or more, redistribution screens are placed in the packed catalyst reactor bed to uniformly distribute the flow of the downwardly flowing reactants across the entire cross-section of the bed. If more than one redistribution screens are used, they are spaced from each other along the depth of the bed at any convenient or desirable distance. The redistribution screens preferably have the frontal surface area which is somewhat less than the cross-section of the bed, and they are placed in a substantially central portion of the cross-section of the bed, with the area between the edge of the redistribution screens and the vertical wall of the reactor being occupied by solid particles (preferably catalyst) of a smaller size than the remainder of the catalyst bed. The smaller size of the packing in this area assures that the void volume near the wall surface, wherein most channeling occurred in prior art reactors, is relatively small, thereby insuring substantially uniform rate of reactants flow throughout the entire cross-sectional area of the bed. The invention is applicable to relatively low liquid velocity systems, e.g., hydroprocessing of heavy petroleum or syncrudes, operated at liquid hourly space velocities (LHSV) of 2.0 or less for a reactor 25 feet in length, which corresponds to liquid linear velocity of about 0.3 cm/sec. or less.

DETAILED DESCRIPTION OF THE INVENTION

The redistribution screen of this invention may comprise any relatively flat surface conforming to the cross-section of a particular reactor means and containing a number of symmetrically arranged openings which distribute down flowing reactants uniformly through the cross-sectional area of the bed. Thus, for example, if the reactor has the shape of a hollow cylindrical tube filled with catalyst, the redistribution means may be a relatively flat round screen made of perforated metal.

As mentioned above, it is preferred to employ the redistribution means whose cross-section is smaller than that of the reactor vessel in which it is employed. The frontal cross-sectional area of the redistribution means is usually at least 70 percent, preferably about 70 to 95 percent, and most preferably 80 to 95 percent, of the cross-sectional area of the reaction vessel. The terms frontal cross-sectional area or frontal surface area designate the area of the redistribution means which initially comes into direct contact with the reactants, and it does not include any surface area attributable to the depth of the redistribution means. The redistribution means has a depth of about 3 to about 15 cm (about 1 to about 6 inches). The redistribution means is placed in the center of the vessel, thereby leaving a void space between the periphery of the redistribution means and the inner wall of the vessel. This void space can then be filled with a porous bed of material, e.g., alumina balls or the particles of the same catalyst as is used in the reaction. However, it is preferred to fill the void space with the catalyst particles used in the reaction. Regardless of the composition of the material used to fill the void space between the redistribution means and the inner wall of the reactor vessel, the size of the particles of the material should be smaller than that of the catalyst used in the reaction. The void fraction of the material used to fill the void space is less than 0.4. The ratio of the size of that material (hereinafter referred to as the second fixed porous bed) to that of the catalyst particles used in the reaction is about 0.2 to about 0.7, preferably about 0.5 to about 0.7. The utilization of the smaller size solid porous particles in the space between the redistribution screen and the inner wall of the reactor assures that the void volume in that area of the packed bed is smaller than that in the remainder of the bed. Accordingly, channeling, if any, in the area between the edge of the redistribution screen and the inner wall of the reactor bed is minimized. Thus, the flow of fluid reactants across the entire cross-section of the reactor bed is substantially uniform, as confirmed by the results of experimental work summarized below. While the apparatus and process of the present invention may be used in conjunction with any reaction wherein the reactants flow co-currently at a relatively low liquid velocity (less than or equal to 2 liquid hourly space velocity for a 25 feet long reactor, which corresponds to 0.3 cm/sec. or less liquid linearly velocity), the process of the present invention is especially useful to provide an improved liquid-gas distribution for the co-current flow hydroprocessing of residual petroleum oils or synthetic crude oils. The invention is especially applicable for catalytic hydrodesulfurization and hydrocracking reactions, but it can also be used in other processes wherein some of the reactants are in liquid phase and some in vapor phase, such as in catalytic polymerization, isomerization of petroleum hydrocarbons, in catalytic hydrogenation of liquid coal extracts, catalytic hydrogenation of aromatic compounds, catalytic oxidation and catalytic halogenation.

More specifically, the invention is applicable for processing heavy feedstocks, e.g., resids or gas oils, in the presence of hydroprocessing catalysts. Such catalysts comprise metals of Group VIA and VIII of the Periodic Chart of the Elements (Fisher Scientific Company Catalog No. 5-702-10, 1978), e.g., nickel/molybdenum or nickel/tungsten for hydrodenitrogenation and cobalt-/molybdenum for hydrodesulfurization, on a suitable support, e.g., alumina.

The invention is also applicable for conducting the process of catalytic dewaxing of any charge stocks containing petroleum wax, e.g., gas oil fractions boiling between 400° F. and 1000° F. and lube oil stocks which are dewaxed in the presence of zeolite catalysts, e.g., ZSM-5 type catalysts. Such processes are disclosed in the following U.S. Pat. Nos. 3,668,113; 3,755,138; 4,222,855; and Re. 28,398, the entire contents of all of which are incorporated herein by reference.

The invention will now be described in conjunction with one embodiment thereof shown in FIGS. 1 and 2. However, it will be understood by those skilled in the art that the embodiment shown in FIGS. 1 and 2, and discussed below, is used herein for illustrative purposes only, and it does not limit the scope or the applicability of the invention.

Figures 1, 2:
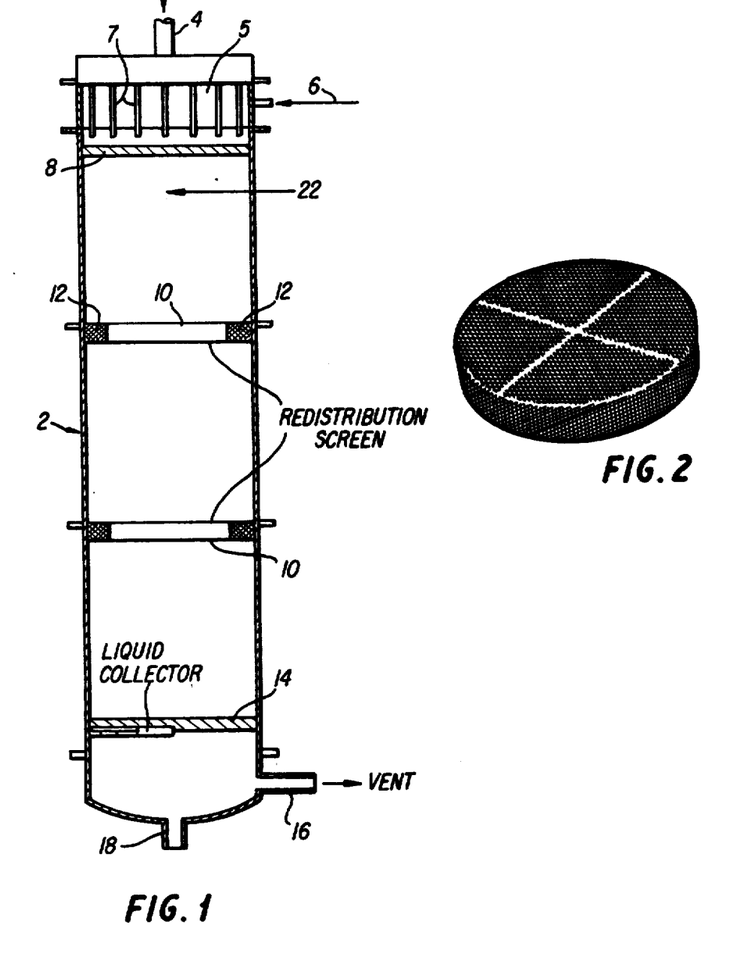
FIG. 1 is a schematic representation of a packed catalyst bed reactor containing the redistribution means of this invention.
FIG. 2 is a perspective view of one exemplary embodiment of the redistribution means.

With reference to FIG. 1, a catalytic packed bed reactor 2 is cylindrical in cross-section. The reactor 2 has two reactants inlets 4 and 6 at the top thereof, so the reactants can flow co-currently downwardly through the packed catalytic bed. The inlet 4 has connected thereto a distributor manifold 5 having a number of perpendicular tubes 7 through which one of the reactants is distributed across the cross-sectional area of the reactor. The distributor manifold 5, with the tubes 7, assures that the reactants introduced through the inlet conduit 4 are uniformly distributed throughout the cross-section of the packed catalyst bed in the reactor. The reactants introduced through the inlet conduits 4 and 6 may either be both liquid, or one of them may be liquid and the other vapor.

The reactor is packed with a suitable packing 20, the upper boundary of which is defined by the layer 8, and the lower boundary by a packing of layer 14. The layers 8 and 14 are comprised of a packing material whose size is approximately double of the packing material 20. There are two redistribution screens 10 placed inside of the packed bed 20. Each of the redistribution screens is circular in cross-section (FIG. 2), and the diameter thereof is somewhat smaller than the diameter of the reactor 2. Accordingly, the space between the edge of the redistribution screen and the inner wall of the reactor 2 is filled by a packing 12, the size of which is somewhat smaller than the size of the catalyst packing 20. As mentioned above, this assures that the void volume in this area of the bed is smaller than the void volume of the remainder of the packed catalyst bed, thereby minimizing or substantially eliminating channeling of the down flowing reactants in this area of the bed. The reactants flow downwardly and, after the reaction is completed, the products thereof are withdrawn at the bottom of the reactor through a conduit 18. A vent 16 is provided for withdrawing gaseous byproducts and unreacted excess reactants.

The redistribution screens 10 can be made of any material which assures uniform distribution of the down flowing reactants throughout the cross-sectional area of the catalyst bed. A suitable material is a wire mesh, as shown in FIG. 2.

The apparatus schematically illustrated in FIGS. 1 and 2 was used in the following example to determine if the use of the redistribution screens reduces channeling near the internal wall of the reactor, and if the co-current downward flow of the reactants is substantially uniform throughout the cross-section of the reactor.

EXAMPLE

The salt-tracer pulse injection method was used to determine the uniformity of the liquid distribution in the column with or without redistribution screens. (The salt-tracer pulse injection method is described in detail in "Gas-Liquid-Solid Reactor Design" by Y. T. Shah (McGraw-Hill 1979) Chapter 3, pp 60–104, the entire contents of which are incorporated herein by reference). The salt (potassium chloride-KCl) was injected through a conduit 22 at the top of the reactor. An electrical conductivity cell was placed below the bottom of the packing to monitor the effluent salt concentration after a pulse injection of the KCl solution.

The cylindrical reactor column had an inside diameter of 49.5 cm with a total packing length of about 267 cm. Water was injected through a conduit 4, and it was uniformly distributed by a distributor 7. Air was introduced through a conduit 6. The air and water flowed co-currently through the column. The major portion (about 94% by volume) of the column was packed with 0.318 cm diameter porous alumina extrudates.

For the experiments with redistribution screens placed in the column, two pancake-shaped screens 10, made of 6-mesh wire screen, each 35.6 cm in diameter and 7.6 cm in height (FIGS. 1 and 2) were placed in the column. Smaller size extrudates (0.159 cm) were used to pack the annular space 12 between the screen and the wall of the column (FIG. 1).

Data acquisition system included a computer with Analog/Digital converter for collecting and digitizing the conductivity data. Pressure transducers were placed near the exit of the packed section to monitor the flow pattern change.

RESULTS

Statistical analysis of the conductivity data was carried out to evaluate the deviation from plug flow under different operating conditions (e.g., changing flow rate, with/without redistribution screens).

To describe the mixing in a packed bed with deviation from plug flow, one can compare the residence time distribution (from the conductivity data) with those of equal-volume continuous stirred tank reactors (CSTRs) in series, in a manner similar to that described by J. J. Carberry in "Chemical and Catalytic Reaction Engineering," Chapter 3, pp. 73–142 (McGraw-Hill, 1976), and by O. Levenspiel in "Chemical Reaction Engineering," Chapter 9, pp. 242–308 (John Wiley and Sons, Inc., 1962), the contents of both of which are incorporated herein by reference. Carberry used the number of CSTRs in series to illustrate the deviation from ideal plug flow for a packed bed. The residence time distribution is determined experimentally. Average residence time and variance can, in turn, be calculated from the residence time distribution. The equivalent CSTRs can be calculated from the ratio of the square of the average residence time to the variance, as discussed by Carberry and Levenspiel. The mixing effect for an ideal plug flow reactor corresponds to that of the infinite number of CSTRs in series. Similar approach in quantifying the mixing effects was adopted in analyzing the conductivity data of this example.

The overall dispersion in a column packed with porous extrudates was contributed to by intraparticle diffusion in the liquid-filled pores and the mixing of the externally trickling liquid. Due to the difference in the average contact time at different flow rates, one has to equalize the contribution from the intraparticle diffusion to make a fair comparison in determining the deviation from plug flow for the externally trickling liquid. Consequently, the calculated equivalent CSTRs was multiplied by the superficial liquid velocity to equalize the contribution from the intraparticle diffusion.

Figure 3:
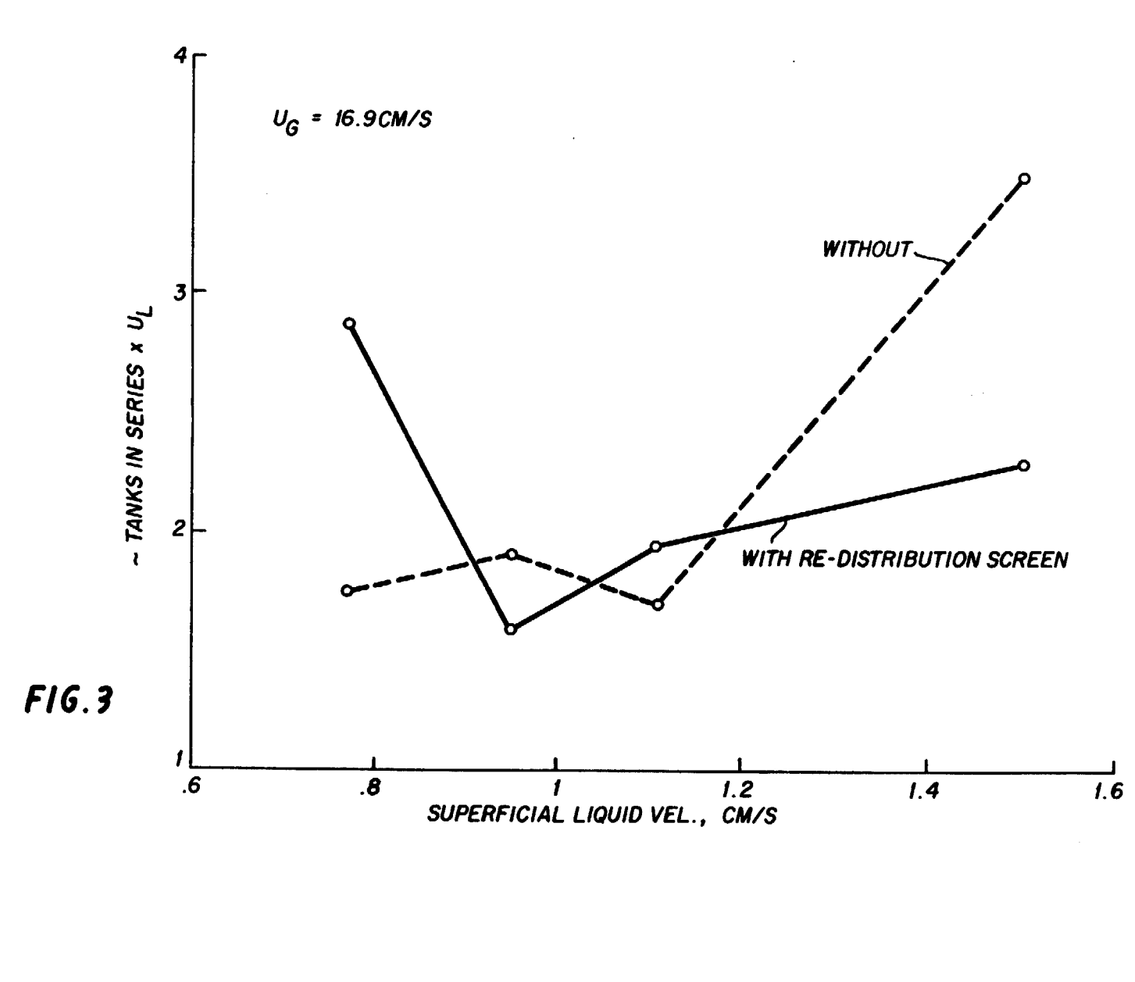
FIGS. 3 through 5 are graphical representations of the number of continuous stirred tank reactors (CSTRs) as a function of superficial liquid velocity for the cases with and without the redistribution screens, for constant gas velocities of 16.9, 13.5, and 8.8 cm/sec., respectively, for the data of the example.
Figure 4:
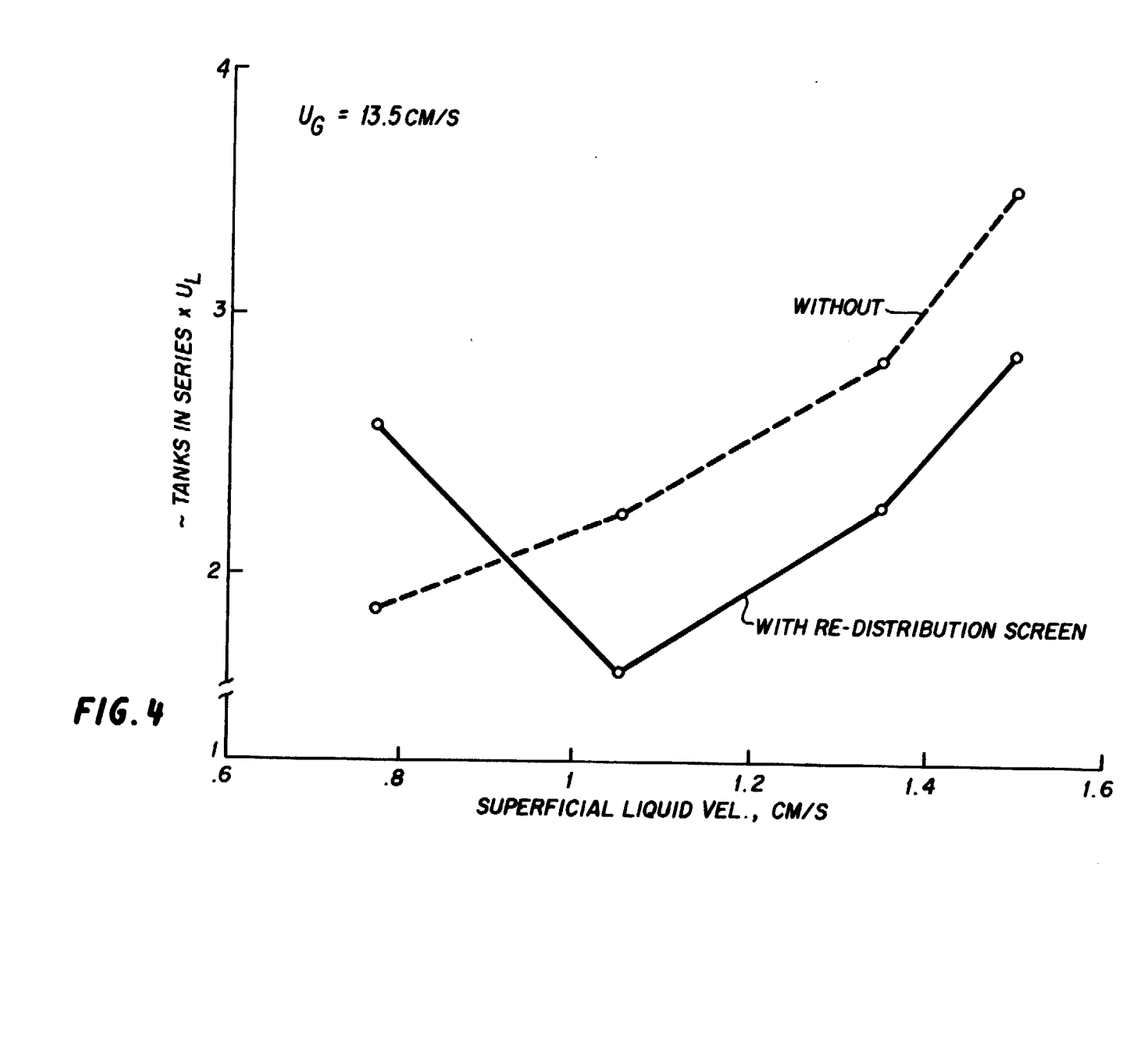
Figure 5:
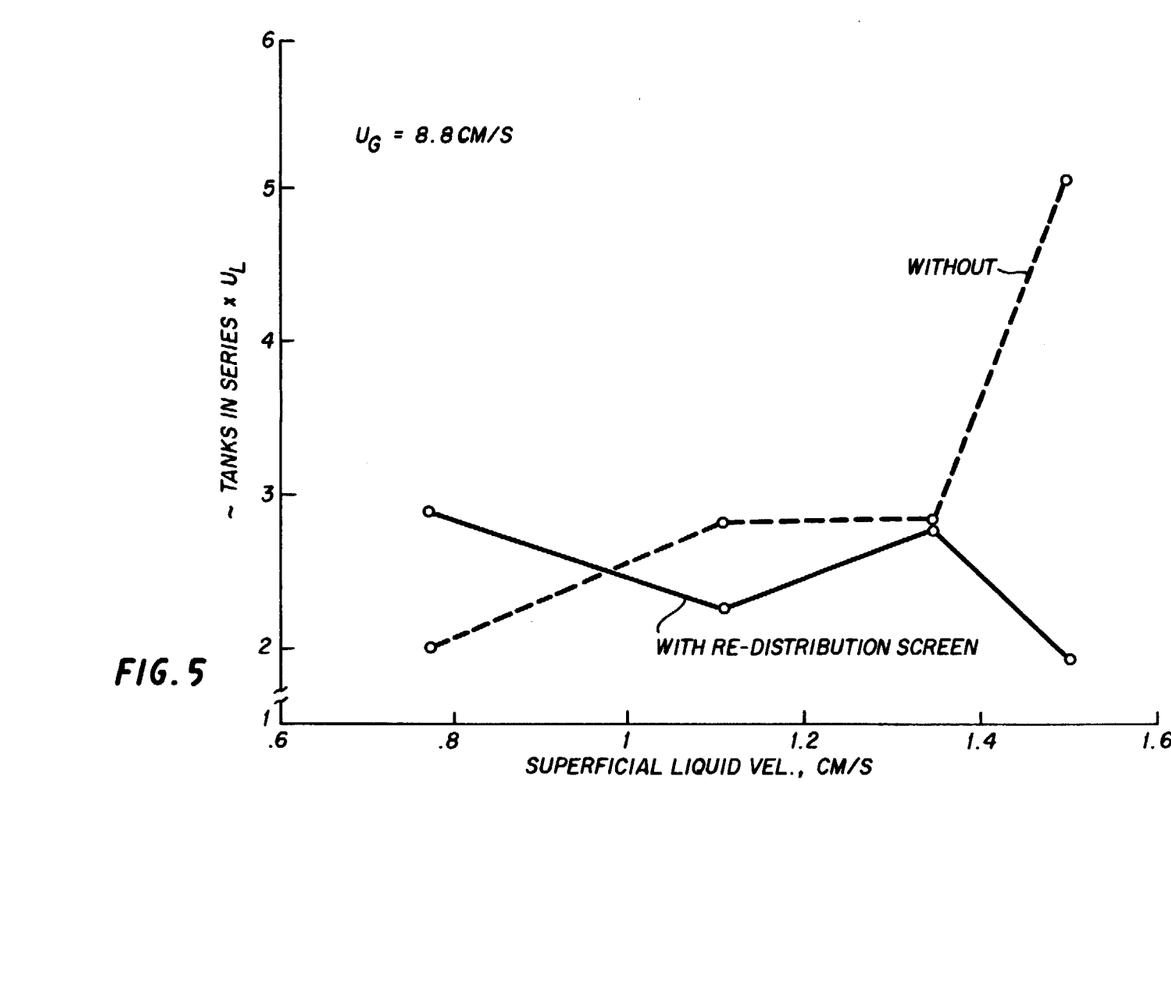
Figure 6:
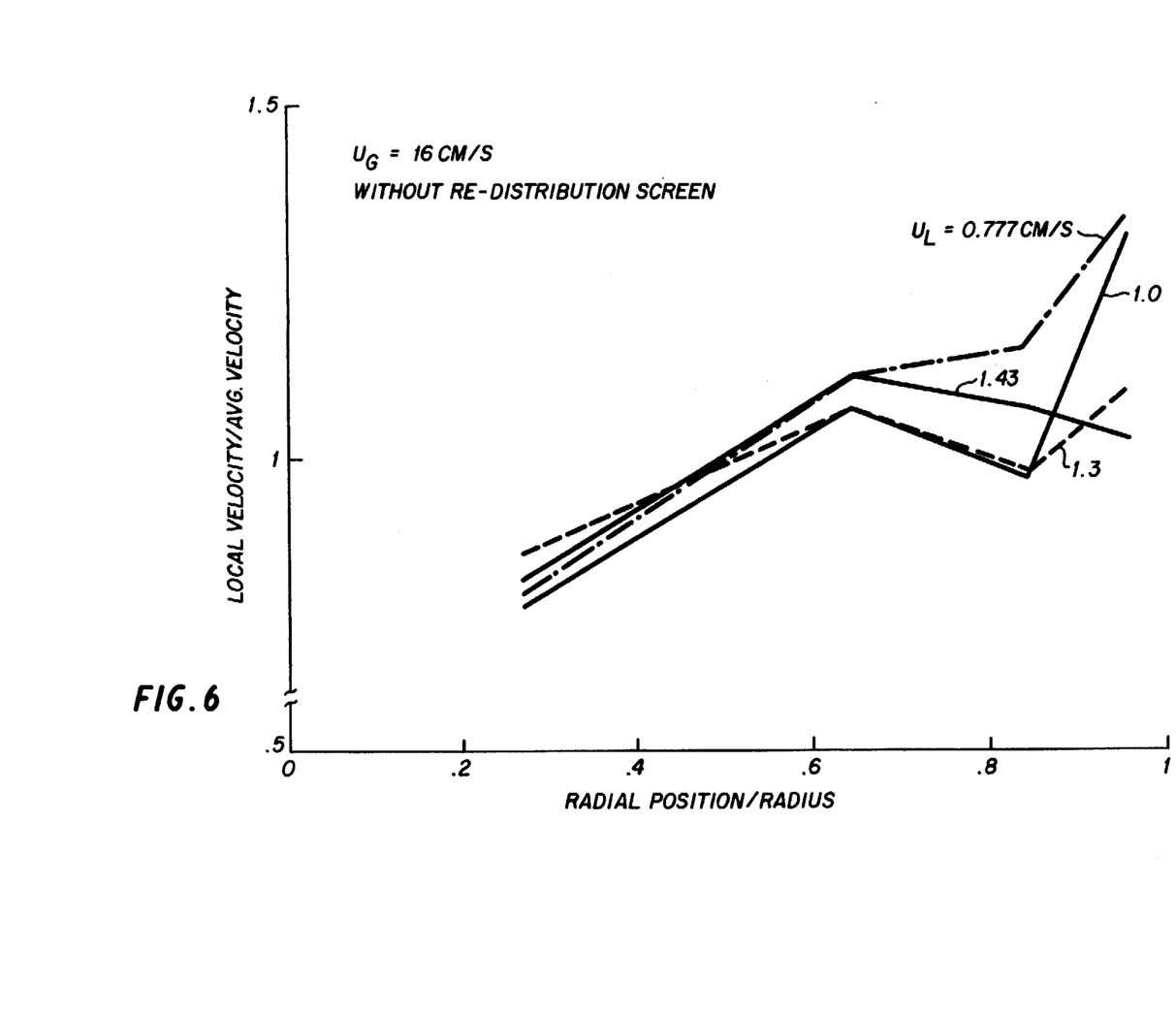
FIG. 6 is a graphical representation of the local liquid velocity as a function of the radial position for the case without the redistribution screens, at gas velocity of 16 cm/sec. for the data of the example.
Figure 7:
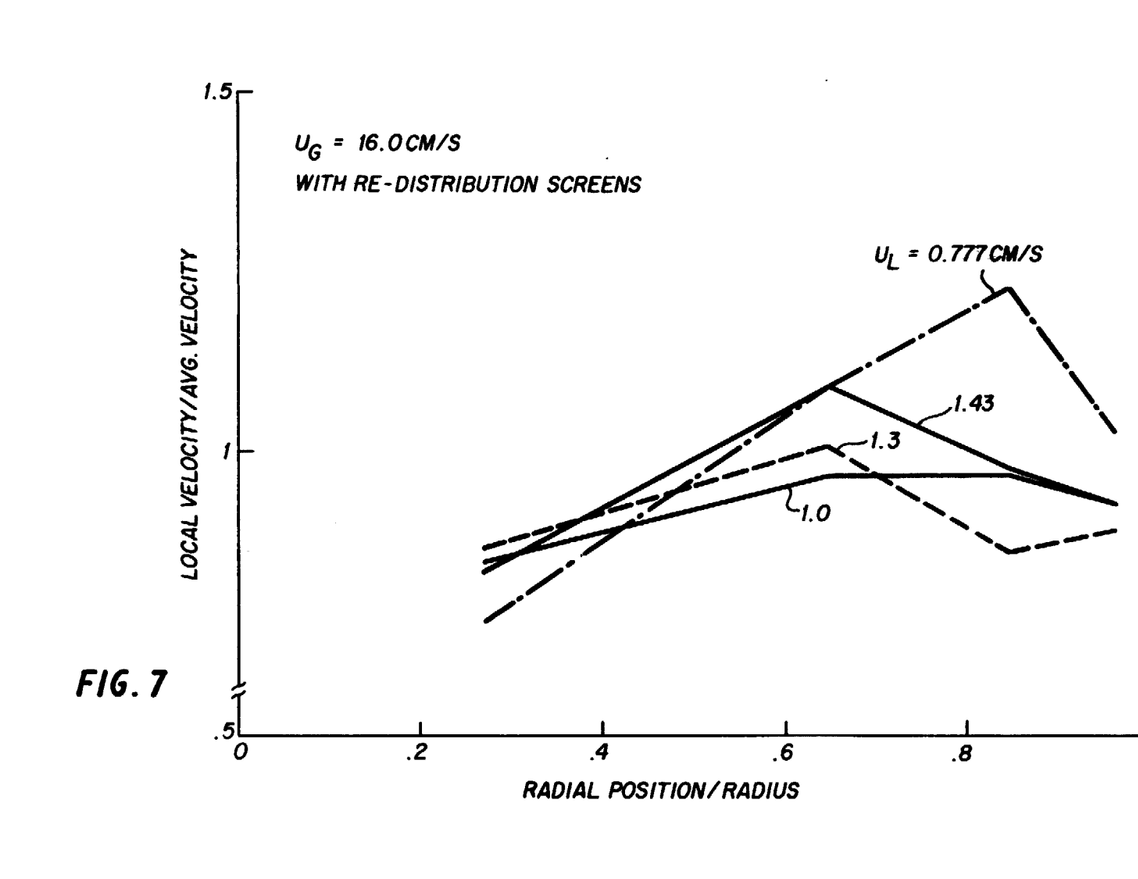
FIG. 7 is a graphical representation of the local liquid velocity as a function of the radial position for the case with the redistribution screens, at gas velocity of 16 cm/sec. for the data of the example.

FIGS. 3, 4 and 5 (and also Table 1, below) show the equivalent number of CSTRs under different operating conditions. The data clearly show that the use of the redistribution screens improves the liquid distribution at low liquid superficial velocity of about 0.8 cm/sec. for this water-air system, where liquid slowly trickled over the packing surface. The improved liquid distribution is evidenced by relatively high number of CSTRs at the low liquid superficial velocity. (Pressure transducer signal and visual observation support the trickling flow at the low liquid flow rate). However, at high liquid flow rate, the uniformity of the liquid distribution with redistribution screens placed in the column became worse as compared with that without the redistribution screens. At the high liquid flow rate pulsing flow was observed visually and detected using pressure transducers. A four-compartment liquid collector was also used to monitor the radial liquid distribution (FIG. 1). The local velocity at different radial locations is shown in FIGS. 6 and 7 for cases without and with the redistribution screens, respectively. A significant reduction in the wall flow (at $r/R > 0.9$) is clearly demonstrated for the column with redistribution screens, especially at low liquid flow rate. The data suggest that the use of the redistribution screens reduces the amount of wall liquid.

This invention is especially applicable in hydroprocessing of heavy crudes in a co-current flow fixed bed with a liquid hourly space velocity (LHSV) of less than 2. An improved liquid distribution (or enhanced catalyst/liquid contacting efficiency) can be realized by placing the redistribution screens in the reactor operated at low LHSV (e.g., hydroprocessing of residual petroleum oils or syn-crudes).

Residue hydroprocessing units are recommended to operate at low space velocity (LHSV<2) due to the presence of large amount of the hard to process reactant in the feed. The continuous depletion of the world light crude supply is continuously pushing the refinery to process more and more heavier crude. Consequently, hydroprocessing of the heavy bottom of the barrel is becoming a potentially profitable field.

The use of this invention allows an operator to efficiently utilize the hydroprocessing units to process heavy residual petroleum or syn-crudes with high catalyst/liquid contacting efficiency.

TABLE 1

Equivalent Number of Tanks in Series Under Different Operating Conditions

| Superficial Gas Velocity ($U_G$) cm/s | Superficial Liquid Velocity ($U_L$) | Equivalent Tanks in Series × $U_L$ | |
|---|---|---|---|
| | | Without | With redistribution screens |
| 16.9 | 1.5 | 3.51 | 2.30 |
| | 1.11 | 1.70 | 1.95 |
| | 0.95 | 1.92 | 1.59 |
| | 0.778 | 1.76 | 2.86 |
| 13.5 | 1.5 | 3.53 | 2.87 |
| | 1.35 | 2.84 | 2.28 |
| | 1.05 | 2.24 | 1.61 |
| | 0.778 | 1.86 | 2.57 |
| 8.8 | 1.5 | 5.06 | 1.93 |
| | 1.35 | 2.82 | 2.79 |
| | 1.11 | 2.83 | 2.25 |
| | 0.778 | 2.01 | 2.89 |

It will be apparent to those skilled in the art that the specific embodiments discussed above can be successfully repeated with reactants equivalent to those generically or specifically set forth above and under variable process conditions.

From the foregoing specification one skilled in the art can readily ascertain the essential features of this invention and without departing from the spirit and scope thereof can adopt it to various diverse applications.

I claim:

1. In a process for downwardly passing a liquid at a relative liquid linear velocity equal to or less than 0.3 cm/sec over a bed of catalyst in a reactor vessel means to effect a chemical reaction and removing products of the reaction from the bottom of the reactor vessel means, an improvement comprising:

passing said liquid over at least one redistribution means located within the bed of catalyst to improve liquid distribution throughout the bed and to improve contact of the liquid with the bed of catalyst, each of said redistribution means occupying at least 70 percent of a substantially central portion of the cross sectional area of said reactor vessel means, and the portion of the cross-sectional area between the redistribution means and the inside wall of the reactor vessel, at the elevation at which said redistribution means is located, being occupied by a second fixed porous bed of material comprised of substantially solid particles of a size relatively smaller than the particles of the bed of catalyst.

2. A process of claim 1 wherein said fluid redistribution means comprises a substantially flat perforated plate means.

3. A process of claim 2 wherein said reactor has at least two of said fluid redistribution means placed in said reactor in spatial relationship with respect to each other.

4. A process of claim 3 wherein the ratio of the size of said solid particles of the second fixed porous bed to the catalyst particles of said bed of catalyst is about 0.2 to about 0.7.

5. A process of claim 4 wherein the liquid is heavy crude oil, residual petroleum oil or synthetic crude.

6. A process of claim 4 wherein the liquid is a chargestock containing petroleum wax and the catalyst is a ZSM-5 type zeolite.

7. A process of claim 5 wherein the catalyst used in the bed of catalyst comprises a metal of Group VIA and a metal of Group VIII on alumina support.

8. A process of claim 7 wherein the second fixed porous bed of material has the same chemical composition as the bed of catalyst.

9. A process of claim 7 wherein the catalyst comprises nickel and molybdenum on alumina support.

10. A process of claim 7 wherein the catalyst comprises nickel and tungsten on alumina support.

11. A process of claim 7 wherein the catalyst comprises cobalt and molybdenum on alumina support.

* * * * *